United States Patent
Morikawa et al.

[11] Patent Number: 5,313,880
[45] Date of Patent: May 24, 1994

[54] APPARATUS FOR DIVIDING BREAD DOUGH OR THE LIKE

[75] Inventors: Michio Morikawa; Koichi Hirabayashi, both of Utsunomiya, Japan

[73] Assignee: Rheon Automatic Machinery Co., Ltd., Tochigi, Japan

[21] Appl. No.: 45,963

[22] Filed: Apr. 9, 1993

[30] Foreign Application Priority Data

| Apr. 17, 1992 [JP] | Japan | 4-032842 |
| Apr. 17, 1992 [JP] | Japan | 4-125738 |
| Apr. 17, 1992 [JP] | Japan | 4-125739 |

[51] Int. Cl.$^5$ ............ A21C 5/00; A21C 7/01; A21C 15/04; A23P 1/00
[52] U.S. Cl. ............ 99/537; 99/450.1; 99/485; 425/142; 425/297; 425/311
[58] Field of Search ............ 99/352, 353, 355, 356, 99/426, 450.1, 450.2, 450.7, 483, 485, 537, 538; 426/272, 503, 512, 513; 425/142, 145, 164, 238, 305.1, 311, 315, 204, 296, 297, 307, 308, 324.1, 403.1; 83/359, 365

[56] References Cited

U.S. PATENT DOCUMENTS

| 1,932,345 | 10/1933 | Kremmling | 425/311 |
| 2,488,046 | 11/1949 | Werner et al. | 425/311 |
| 2,890,662 | 6/1959 | Baiocchi | 425/311 |
| 3,415,206 | 12/1968 | Reisman | 425/311 |
| 3,568,251 | 3/1971 | Walker | 425/311 |
| 3,737,269 | 6/1973 | Grady | 425/311 |
| 4,552,523 | 11/1985 | Suzuki | 99/450.1 |
| 4,556,379 | 12/1985 | Ikishima | 425/297 |
| 4,597,731 | 7/1986 | Suzuki | 426/272 |
| 4,676,727 | 6/1987 | Atwood | 99/537 |
| 5,200,203 | 4/1993 | Hayashi | 425/142 |

*Primary Examiner*—Timothy F. Simone
*Attorney, Agent, or Firm*—Limbach & Limbach

[57] ABSTRACT

An apparatus for dividing bread dough or the like is provided, which comprises a dough-cutting member comprising a saw blade means, two dough-supporting members, and a drive means for reciprocating the saw blade means, and by which a plastic material such as bread dough or confectionery dough is smoothly severed, whereby pieces of divided bread dough, each having a plate-like form in which no stress has occurred, are obtained. Further, an apparatus for supplying a uniform strip of bread dough or the like is provided, which comprises the apparatus for dividing bread dough and a stretcher or the like for preparing a sheet of dough. By this apparatus, pieces of divided bread dough, each having a plate-like form, are supplied, and these pieces of bread dough are joined to each other to make a uniform strip of bread dough in which no stress has occurred.

19 Claims, 10 Drawing Sheets

APPARATUS FOR DIVIDING BREAD DOUGH OR THE LIKE

BACKGROUND OF THE INVENTION

1. Field of the Invention

This invention relates to an apparatus for dividing bread dough. In particular, the invention relates to an apparatus for dividing bread dough by which a bread dough mass can be smoothly sliced, thereby obtaining pieces of bread dough that each have a plate-like form. More particularly, the invention relates to an apparatus for supplying a uniform strip of a plastic material such as bread dough by which the material can be easily divided, and by which a uniform strip of bread dough in which no stress is generated can be produced.

2. Prior Art

Japanese Utility Model Publication No. 47-34034 discloses an apparatus for cutting soft foodstuffs such as butter and the like. In FIG. 12, a cylinder (1) for accomodating a material to be cut (33) is mounted on a base (not shown), and a frame (2) adapted to be horizontally moved back and forth relative to the cylinder is arranged below it. In the frame, two pairs of guide rollers (4,5, and 3,6) are rotatably mounted on it. A first belt (8) is entrained on a first pair of rollers (4,5), and a second belt (9) is entrained on a second pair of rollers (3,6). The two ends of the first belt (8) are securely mounted on a mounting element (12) extending from the side of the cylinder. Also, the two ends of the second belt (9) are securely mounted on a mounting element (13) extending from the side of the cylinder, opposite from the side from which the mounting element (12) extends. A knife (7) is positioned near the forward end of the belt (8) and mounted on the frame (2). The roller (6) is positioned below the roller (5). The frame is provided at its-bottom with a groove (21). A guide roller (16) and a driven roller (17) are arranged below the frame (2). An endless belt (15) is entrained on the rollers (16,17) to construct a conveyor for conveying divided butter and the like. The driven roller (17) is mounted on a free wheel (not shown) that is connected to a shaft (18) of the driven roller (17). A pinion gear (19) is fixedly mounted on the shaft (18). At a position below the conveyor are arranged a disc (25) adapted to be rotated by a drive motor (24) installed on the disc (25), a crank arm (26), one of the two ends of which is swingably and eccentrically mounted on the disc (25), and a lever (22). One of the two ends of the lever (22) is swingably connected to the base, and the other end has a roller (23) which engages the groove (21). The other end of the crank arm (26) is swingably mounted on the lever (22) at a position near one end of the lever (22). A rack (20) is so arranged that it engages the pinion (19), and its base part engages a projection protruding from the lever (22) at a position near the roller (23).

When the motor (24) is energized, the disc (25) is rotated in a direction indicated by an arrow (27), so that the lever (22) swings in a direction indicated by an arrow (28). This causes the rack (20) to be moved in a direction indicated by an arrow (29). Therefore, the pinion (19) is rotated in a direction indicated by an arrow (30). This leads to the rotation of the driven roller (17) in the same direction, so that the belt (15) is moved in a direction indicated by an arrow (31). Simultaneously, the roller (23) of the lever (22) pushes the frame (2) in a direction indicated by an arrow (32), so that the knife (7) begins to cut the material (33) and so that the upper flight of the first belt (8) positioned inside the cylinder begins to form a part of the bottom thereof. Also, the area of the upper flight of the second belt (9) positioned in the cylinder forming the bottom thereof begins to decrease. Thus, as shown in FIG. 13, a piece (14) (described by a dotted line) of the material (33) is transferred to the belt (15). When the edge of the knife (17) reaches an end point, the lever (22) begins to swing in a direction indicated by a dotted arrow (34). This causes the rack (20) to be moved in a direction indicated by a dotted arrow (35). This leads to the rotation of the pinion (19). However, since because of the free wheel the driven roller (17) is not rotated, the belt (15) remains stationary. Simultaneously, the backward movement of the frame (2), in a direction indicated by a dotted arrow (36), causes the first belt (8) and the second belt (9) to be retracted and advanced, respectively. Therefore, the material (33) supported by the upper flight of the belt (8) is progressively transferred to the belt (9).

If this prior-art apparatus were to be used to cut bread dough having a high viscosity and elasticity, pieces of bread dough having a plate-like form could not be produced. The reason is that the knife edge could not enter the bread dough mass, that a part of the bread dough would be forcibly pulled in the advancing direction of the knife, and that a shearing, tensile, or compressive stress would occur in the dough. This would cause the dough to be deformed or to adhere to the knife. Therefore, the bread dough would tend to take an irregular shape after being cut. This would result in dough-tissue deterioration, and a good cutting operation could not be obtained.

SUMMARY OF THE INVENTION

This invention aims to combine a dough-cutting member that can smoothly enter bread dough, even if its viscosity and elasticity are high, with other constituent elements, thereby providing an apparatus for dividing a bread dough mass by which it can be smoothly sliced without imparting an excessive or unreasonable force to the bread dough, so that damage to the dough tissue is decreased.

It is therefore an object of this invention to provide an apparatus for dividing bread dough by which a plastic material such as bread dough or confectionery dough can be smoothly sliced.

Another object of this invention is to provide an apparatus for supplying a uniform strip of a plastic material such as bread dough or confectionery dough by which the material can be smoothly divided, and by which a uniform strip of bread dough can be continuously produced.

By one aspect of this invention, an apparatus for dividing bread dough is provided, which comprises a hopper for dough, the bottom of which is constituted by a first dough-supporting member, a second dough-supporting member, a dough-cutting member, and a dough outlet, said first dough-supporting member being movable back and forth, and comprising a flat upper surface, a bottom surface, a horizontal forward edge, and a rearward edge, said forward edge extending perpendicular to the direction of movement of said member, said dough-cutting member comprising a saw blade means, and being, at said forward edge of said first dough-supporting member, flush therewith, a drive means for reciprocating said saw blade means in the longitudinal direction while said first dough-supporting member is moved in its advancing direction, said second dough-supporting member being movable in the same direction and in synchronization with said first dough-supporting member, being provided with a flat upper surface positioned at a level lower than the upper surface of said first dough-supporting member, thereby forming said dough outlet between said second dough-supporting member and said cutting member, and a drive means for moving said first and second dough-supporting members back and forth.

By another aspect of this invention, an apparatus for supplying a uniform strip of bread dough or the like is provided, which comprises an apparatus for dividing bread dough comprising a hopper for dough, the bottom of which is constituted by a first dough-supporting member, a second dough-supporting member, a dough-cutting member, and a dough outlet, said first dough-supporting member being movable back and forth, and comprising a flat upper surface, a bottom surface, a horizontal forward edge, and a rearward edge, said forward edge extending perpendicular to the direction of movement of said member, said dough-cutting member comprising a saw blade means, and being, at said forward edge of said first dough-supporting member, flush therewith, a drive means for reciprocating said saw blade means in the longitudinal direction while said first dough-supporting member is moved in its advancing direction, said second dough-supporting member being movable in the same direction and in synchronization with said first dough-supporting member, being provided with a flat upper surface positioned at a level lower than the upper surface of said first dough-supporting member, thereby forming said dough outlet between said second dough-supporting member and said cutting member, and a drive means for moving said first and second dough-supporting members back and forth, a supply conveyor arranged below said dividing apparatus for conveying divided dough pieces, a downstream conveyor arranged downstream of said supply conveyor, a single roller or a plurality of rollers spaced apart from the upper flights of said supply and downstream conveyors, and arranged, while being rotated, so as to reciprocate over said supply and downstream conveyors and over a certain distance of the conveyance paths of said two conveyors, and a dough-width-measuring device arranged adjacent the downstream end of said supply conveyor.

By still another aspect of this invention, an apparatus for supplying a uniform strip of bread dough or the like is provided, which comprises an apparatus for dividing bread dough comprising a hopper for dough, the bottom of which is constituted by a first dough-supporting member, a second dough-supporting member, a dough-cutting member, and a dough outlet, said first dough-supporting member being movable back and forth, and comprising a flat upper surface, a bottom surface, a horizontal forward edge, and a rearward edge, said forward edge extending perpendicular to the direction of movement of said member, said dough-cutting member comprising a saw blade means, and being, at said forward edge of said first dough-supporting member, flush therewith, a drive means for reciprocating said saw blade means in the longitudinal direction while said first dough-supporting member is moved in its advancing direction, said second dough-supporting member being movable in the same direction and in synchronization with said first dough-supporting member, being provided with a flat upper surface positioned at a level lower than the upper surface of said first dough-supporting member, thereby forming said dough outlet between said second dough-supporting member and said cutting member, and a drive means for moving said first and second dough-supporting members back and forth, a weighing device for weighing divided pieces of dough located below said dividing apparatus, a supply conveyor arranged below said weighing device for conveying the divided pieces of dough, a detector for detecting the distance that said supply conveyor travels, a control unit for generating a signal to actuate said weighing device and said dividing apparatus, and a pressing device for pressing said divided pieces of dough arranged on said supply conveyor.

The dough-cutting member of this invention comprises a saw blade means and a drive means for reciprocating the saw blade means in the longitudinal direction while the saw blade means is moved in its advancing direction. Therefore, even viscous and elastic bread dough can be exactly sliced by the fine movements of the saw blade means, so that no stress occurs in the bread dough. Also, pieces of dough that have an exact preset plate-like shape may be obtained. This leads to an apparatus that divides bread dough into good-quality bread dough pieces.

BRIEF DESCRIPTION OF THE DRAWINGS

FIGS. 12 and 13 show side views illustrating a prior-art apparatus for cutting soft foodstuffs such as butter and the like.

PREFERRED EMBODIMENTS OF THE INVENTION

Figure 1:
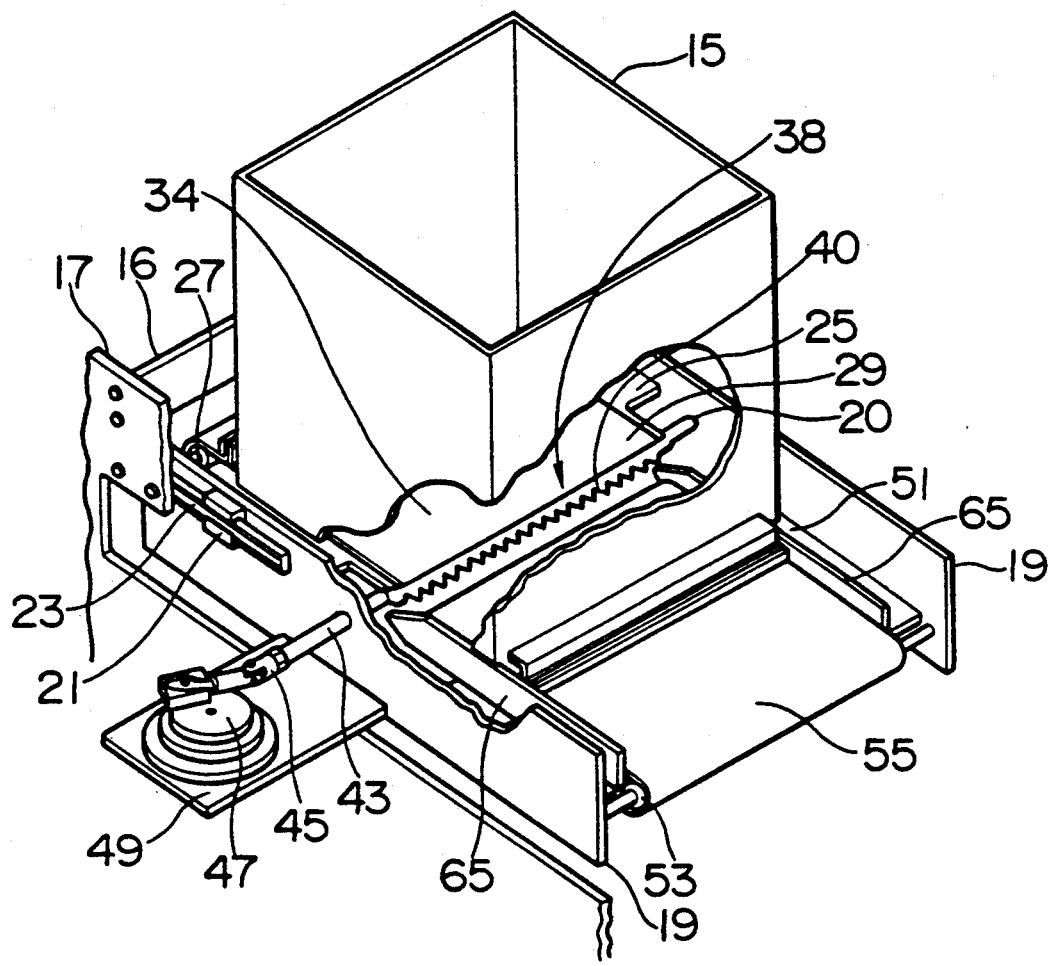
FIG. 1 is a perspective, partially sectional view illustrating a first embodiment of this invention.

A first embodiment of this invention will now be explained by referring to the attached drawings. In FIG. 1, a hopper (15) for accomodating a bread dough mass (14) (see FIG. 3) is mounted to a beam (16), which is fixed on a base (17). Slide rails (23) are mounted on the base (17), and slide bearings (21) are mounted on a frame (19). The slide rails (23) and the slide bearings

(21) are slidably combined. The frame (19) is adapted to be horizontally moved, and to move backward and forward relative to the base (17), by any conventional drive means.

A first plate (25), which is a flat and square, is horizontally mounted on the frame (19), adjacent the rear edge of the first plate (25). A first roller (27) is rotatably mounted on the frame (19), adjacent the rear edge of the first plate (25). A first belt (29) is entrained on the first plate (25) and first roller (27). The first plate (25), first roller (27), and first belt (29), constitute the main elements of a first dough-supporting member (30) (see FIGS. 3 and 4). The first dough-supporting member (30) has a flat upper surface (34) (see FIG. 4), a horizontal forward edge, a lower surface, and a rearward edge. The horizontal forward edge extends perpendicularly to the direction of movement of the first dough-supporting member. The two ends of the first belt (29) are securely mounted on a first bracket (33) extending from one of the sides of the hopper (15) (see FIG. 3). Therefore, the horizontal movement of the frame (19) causes the first plate (25) and the first roller (27) to be horizontally moved. Although the frame (19) is horizontally moved so as to change its position relative to the hopper (15), the positional relationship of the part of the first belt (29) to the bottom (36) of the bread dough mass (14) in the hopper (15) is not changed. Namely, upon the horizontal movement of the frame (19), the first plate (25) and the first roller (27) are horizontally moved in the same direction of movement of the frame (19). However, since the first belt (29) is fixed at the first bracket (33), the first belt (29) does not move, but instead, the area of the belt (29) is changed due to the movement of the first dough-supporting member (30).

The first belt (29) may be endless, or it may be removed. In such a case, the advantage of the above-mentioned embodiment of the belt may not be obtained, but it may still be workable depending on various parameters and by adding other means to loosen the friction between it and dough above it.

Figure 2:
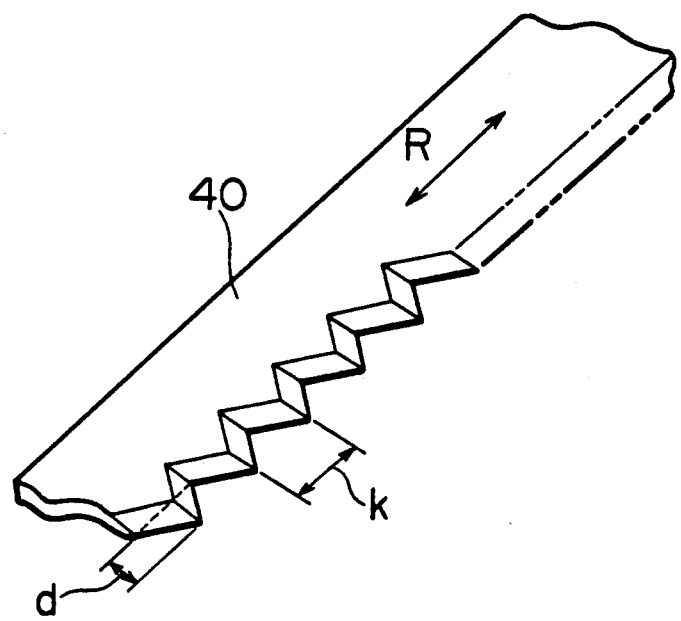
FIG. 2 is a perspective view illustrating the saw blade used in the first embodiment of this invention.

A dough-cutting member (38), comprising a saw blade means, such as a saw blade (40) shown in FIG. 2, is positioned in front of the forward edge of the first dough-supporting member (30), namely, the forward end of the first belt (29). The upper surface of the blade (40) is flush with the flat upper surface (34) of the first dough-supporting member (30). One end of the saw blade (40) is connected to a slide rod (43), and the other end of it is adapted to be slidably received in a hole (20) formed on the frame (19). The slide rod (43) is connected by means of a universal joint (45) to a crank device (47). It is mounted on a small plate (49) that is fixed on the frame (19), and is adapted to be driven by a drive means (not shown). Therefore, the saw blade (40) can be advanced together with the first dough-supporting member (30). Also, when the drive means is energized, the saw blade (40) can be reciprocated in the direction perpendicular to the movement of the first dough-supporting member (30).

A perspective, partially cutaway view of the saw blade (40) is illustrated in FIG. 2. In it, (k) stands for a distance between the two adjacent tips of the saw edge, and (d) stands for the depth of the trough. In this embodiment, (d) is 4.3 mm, and (k) is 5 mm.

A second plate (51) is mounted on the frame (19) in a position where it is located below the dough-cutting member (38). A second roller (53) is rotatably mounted on the frame (19). A second belt (55) is entrained on the second plate (51) and second roller (53). The second plate (51), second roller (53), and the second belt (55), constitute the main elements of a second dough-supporting member (56). The second dough-supporting member (56) has a flat upper surface (61), a forward edge, a rearward edge, and a lower surface. This member is adapted to be moved horizontally back and forth since it is mounted on the frame (19). The flat upper surface (61) is positioned below the flat upper surface (34) of the first dough-supporting member (30). The two ends of the second belt (55) are securely mounted to a second bracket (59) extending from the side of the hopper (15) opposite from the side from which the first bracket (33) extends.

Since the second dough-supporting member (56) is mounted on the frame (19) like the first dough-supporting member (30), it is evident that the second dough-supporting member (56) is adapted to be moved in the same direction and in synchronization with the first dough-supporting member (30). Since the rearward edge of the second dough-supporting member is positioned to be lower than and spaced apart from the saw blade (40), a dough outlet (40) is provided between the second dough-supporting member and the saw blade (40). The first and/or second dough-supporting members, the saw blade (40), and the dough outlet (35), constitute the bottom of the hopper (15).

The increase and decrease of the area of the part of the flat upper surface (61) of the second dough-supporting member (56) positioned in the hopper (15) are in an inverse relationship to the increase and decrease of the area of the part of the flat upper surface (34) of the first dough-supporting member (30) in the hopper (15). Two guards (65) (see FIG. 1) for preventing the dough from overflowing from the flat upper surface (61) are mounted on the second plate (51), adjacent both sides of the second belt (55).

The operation of the first embodiment of the apparatus for dividing the bread dough will be explained below.

Figure 3:
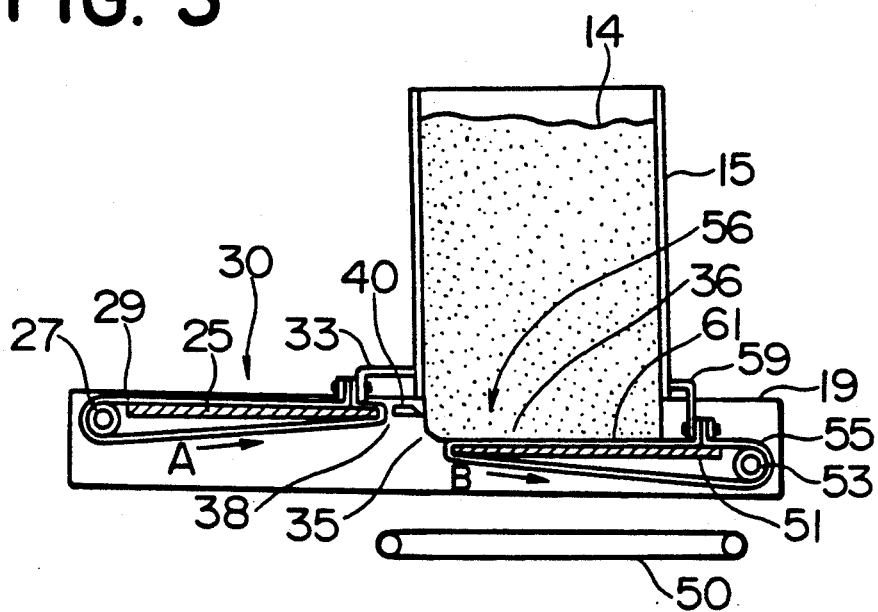
FIGS. 3, 4, and 5 are sectional and side elevation views illustrating the slicing operation of the first embodiment of this invention.

At the start of the cutting operation, the bottom (36) of the dough mass (14), kneaded by a conventional technique and supplied to the hopper (15), is supported only by the flat upper surface (61) of the second dough-supporting member (56), as shown in FIG. 3. The dough-cutting member (38), positioned at the forward end of the first dough-supporting member (30), is outside of the hopper (15). A drive gear (not shown) causes the frame (19) to move in the rightward direction as viewed in FIG. 3, whereby the cutting operation starts. The advancing speed of the frame (19), namely, of the dough-cutting member (38), is 4 m/min. With the start of the movement of the frame (19), a motor (not shown) causes the crank device (47) (FIG. 1) to begin to rotate. This rotation causes, through the universal joint (45), the slide rod (43) to be reciprocated. Therefore, the saw blade (40) is reciprocated, so that the cutting movement begins. A stroke of the reciprocating movement of the saw blade (40), represented by (R) in FIG. 2, is 20 mm. Thus, the edge of the saw blade (40) is advanced into the dough mass (14), and smoothly severs it.

The reciprocating movements of the saw blade (40) are effective in cutting bread dough that has a strong elasticity and a high cutting resistance. When the saw blade (40) enters the dough mass (14), it does not impart any forcible or pulling action to the dough mass (14). Therefore, no stress occurs in the dough. The dough mass (14) is severed and divided into dough pieces (67)

(FIG. 5), while a finely cut surface is formed. The advance of the frame (19) causes the first plate (25) to be advanced together with the saw blade (40). Therefore, by the guiding of the forward end of the first plate (25), the part of the belt (29) positioned on the lower surface of the first dough-supporting member (30) is also advanced in a direction indicated by an arrow (A), and moves past the forward edge of the first plate (25) and becomes a part of the flat upper surface (34). By the rightward movement of the first dough-supporting member (30), the area of the flat upper surface (34) positioned in the hopper (15) increases.

Figure 4:
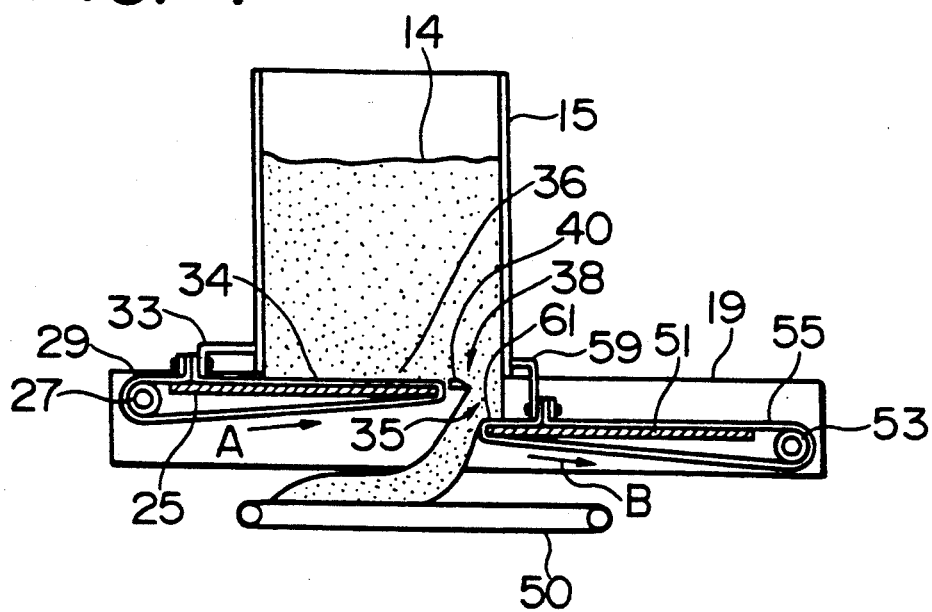

FIG. 4 shows that a part of the dough mass (14) has been nearly severed by the saw blade (40). That part of the dough mass is partially on a lower conveyor (50). During the cutting operation, since the two ends of the first belt (29) are securely mounted on the first bracket (33), the first belt (29) cannot be freely rotated and is kept stationary relative to the dough mass (14) inside the hopper. Namely, the flat upper surface (34) can stably contact and support the bottom (36) of the dough mass (14).

Simultaneously with the starting of the cutting of the dough, the second belt (55) is retracted in a direction indicated by an arrow (B), so that the area of the flat upper surface (61) is decreased. Since the two ends of the second belt (55) are securely mounted on the second bracket (59), the flat upper surface (61) of the second belt (55) does not move relative to the lowest part (36) of the bread dough (14). Thus, no tensile force due to any possible friction between the flat upper surface (61) of the belt (55) and the dough is imparted to it. Accordingly, not only can the dough mass be smoothly cut by the saw blade (40), but also no stress in the dough mass that remains in the hopper (15) occurs.

Figure 5:
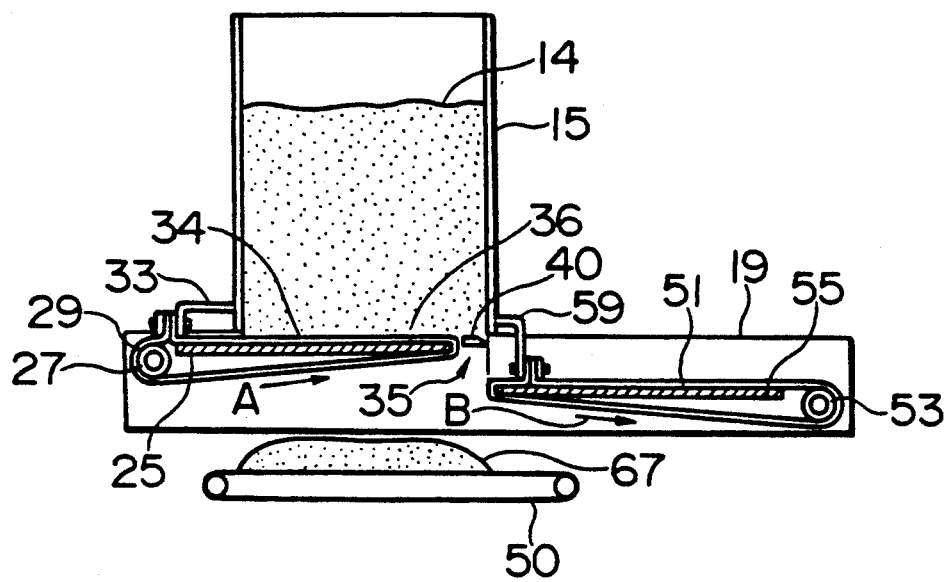

FIG. 5 shows that a part of the dough mass (14) has been completely severed by the saw blade (40), and that pieces of dough (67) are placed on the conveyor (50). Thus, pieces of dough (67) in which the gluten tissue is not damaged are obtained.

When the cutting of the bread dough mass (14) by the saw blade (40) is finished, its reciprocating movements are stopped. Simultaneously, the frame (19) begins to move in a direction opposite to that in the cutting operation, to return to the starting position. At the same time, the area of the flat upper surface (34) begins to decrease. During the retraction of the first dough-supporting member (30), no pulling action is applied to the bread dough (14). Also, the area of the flat upper surface (61) is increased. In this case also, no pulling action is applied to the bread dough mass (14). Finally, the frame (19) returns to the starting position, so that one cycle of the cutting operation ends.

Figure 6:
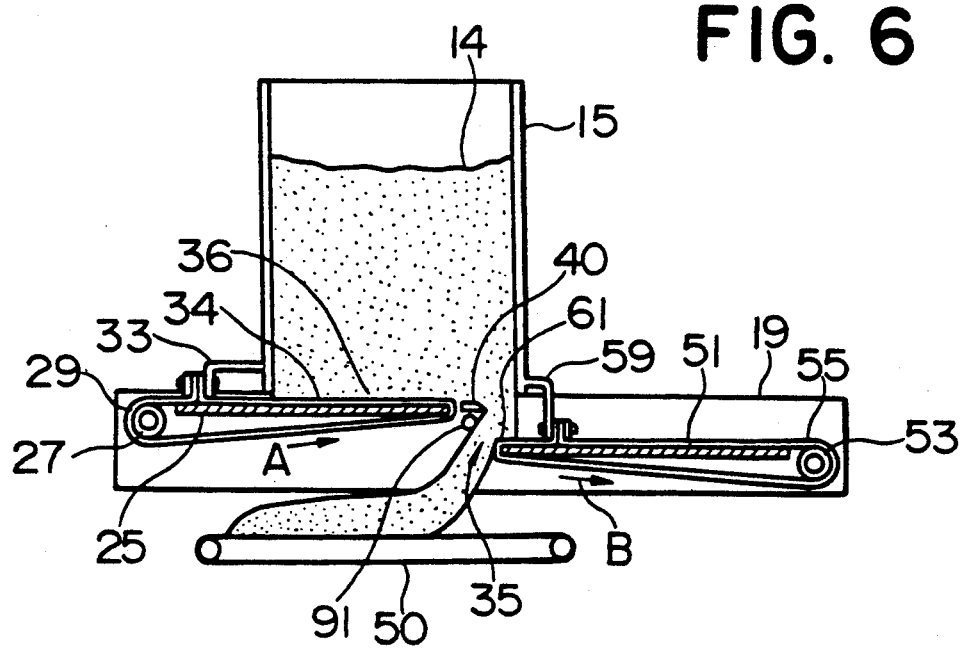
FIG. 6 is a sectional and side elevational view illustrating a second embodiment of this invention.

FIG. 6 shows a second embodiment of this invention, namely, another apparatus for dividing bread dough, in which a small-diameter roller (91) is arranged below and adjacent the saw blade (40). Although the saw blade (40) can satisfactorily sever almost all kinds of bread dough, some of the bread dough tends to adhere to the underside of the saw blade (40). Therefore, the small-diameter roller (91) that rotates clockwise peels off the dough from the blade (40). The conditions of the operation of this embodiment are substantially the same as that of the first embodiment. By this construction, it is possible to further smoothly sever and divide the dough mass.

Figure 7:
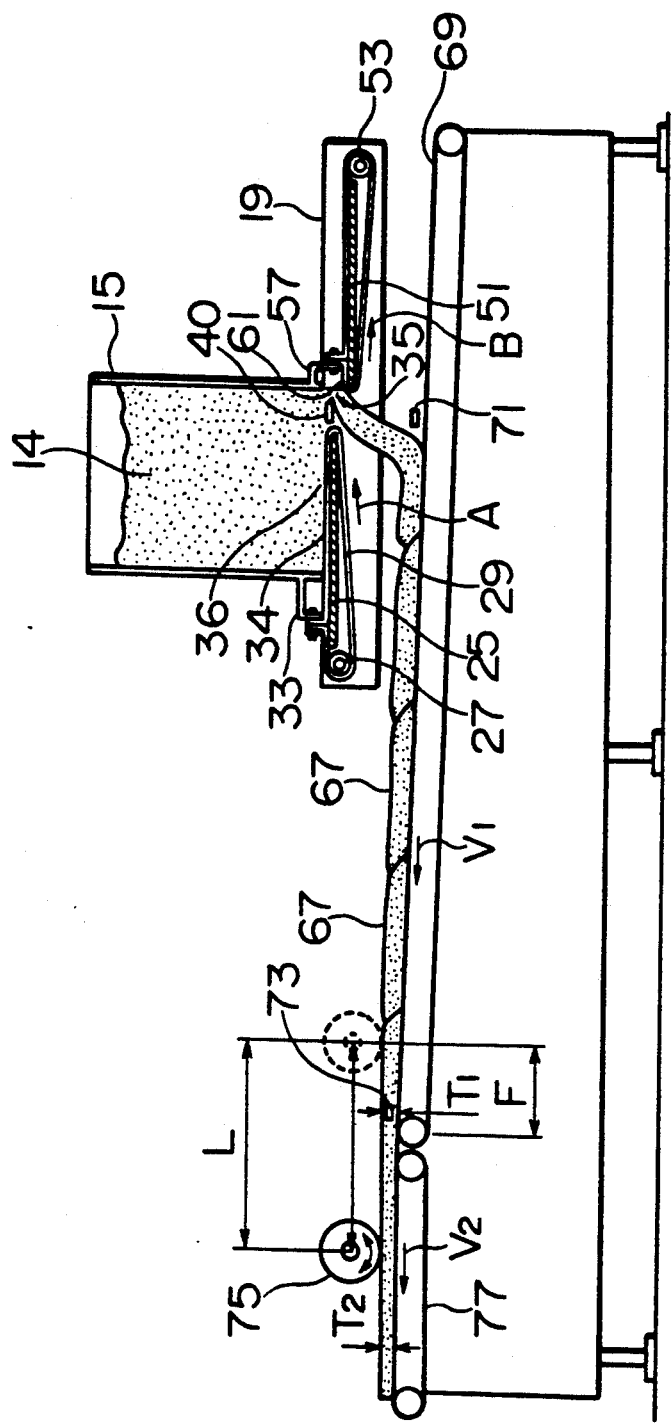
FIG. 7 is a sectional and side elevational view illustrating a third embodiment of this invention.

FIG. 7 shows a third embodiment of this invention, namely, an apparatus for supplying a uniform strip of bread dough.

A supply conveyor (69) is located below the frame (19). The conveyor (69) is adapted to convey pieces of dough (67) cut by the saw blade (40). A sensor (71) for detecting the rear end of the piece of dough (67) is arranged below the apparatus for dividing bread dough and adjacent the upper flight of the supply conveyor (69). A dough-width-measuring device (73) and a dough-thickness measuring device (not shown) are arranged adjacent the downstream end of the supply conveyor (69). They are positioned within a region (F) ranging from the upstream limit of the reciprocating movements of a roller (75) to the downstream end of the supply conveyor (69). The region (F) is also included in a region (L) wherein the roller (75) reciprocates, while being rotated, over the supply conveyor (69) and a downstream conveyor, (77).

The operation of the apparatus for supplying a uniform strip of bread dough will be explained below.

Pieces of dough (67), divided by the apparatus explained in the first embodiment are placed on the supply conveyor (69) and are stretched by the roller (75). When the rear end of a divided piece of dough is detected by the sensor (71), it generates a command signal to start the next cutting of the dough, thereby supplying the next divided piece of dough. This signal is generated so that the leading part of the next divided piece of dough can exactly overlap the rear end of a divided piece of dough that has been divided just before it. Similarly, pieces of dough (67) are continuously supplied, arranged on the supply conveyor (69), and conveyed to the downstream conveyor (77). The roller (75) reciprocates over the region (L), which is located over the supply conveyor (69) and downstream conveyor (77), while the roller (75) is rotated. The stretched pieces of dough become on the downstream conveyor (77) a strip of dough having preset values of a moving speed V2, a thickness T2, and a width W2. The conveying speed V1 of the supply conveyor (69) is calculated and determined by the following formula:

$$V1 = (V2 \times T2 \times W2)/(T1 \times W1)$$

wherein T1 is the thickness of the dough determined by the dough-thickness-measuring device, and W1 is the width of the dough determined by the dough-width-measuring device (73). This formula shows that V1 is in inverse proportion to T1 and W1. The speed V1 of the supply conveyor (31) is calculated, based on the formula above, by a control unit (not shown).

Figure 8:
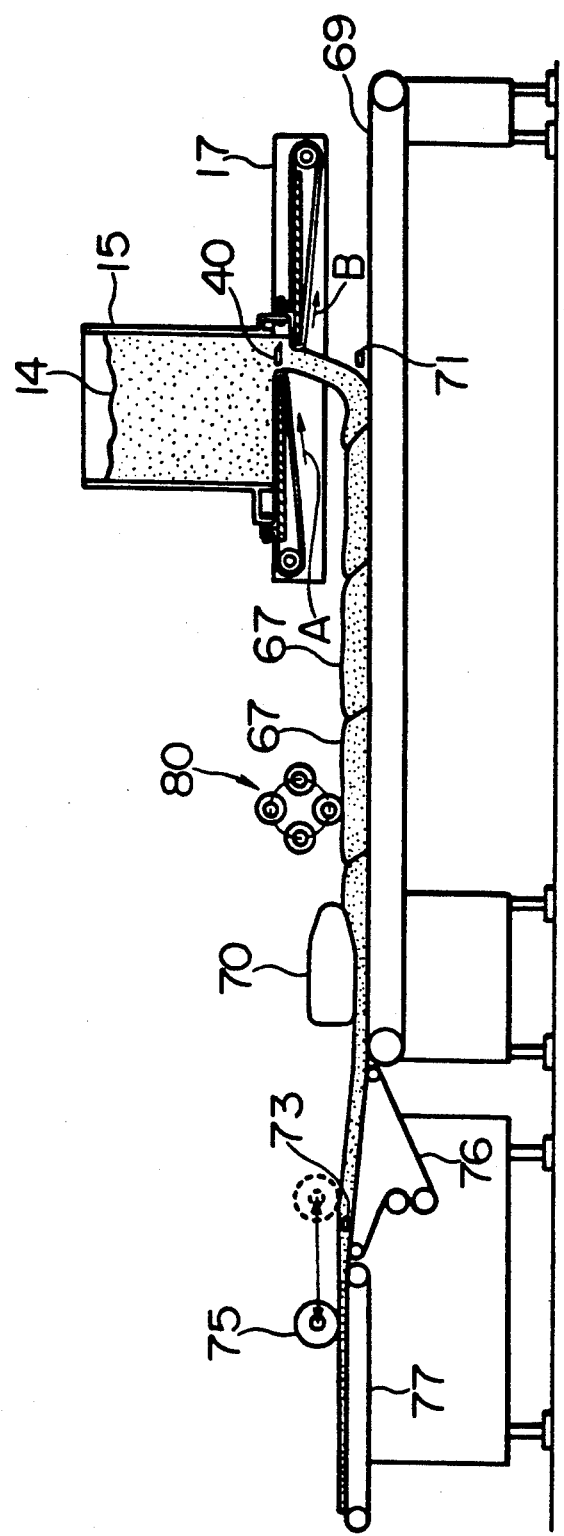
FIG. 8 is a sectional and side elevational view illustrating a fourth embodiment of this invention.

FIG. 8 shows a fourth embodiment of this invention. It is another apparatus for supplying a uniform, strip of bread dough. In this embodiment, the joining of the arranged pieces of dough (67) is effectively attained by a roller mechanism (80). It comprises a plurality of rollers that are adapted, while rotating, to move on a circular path. A crossing roller (70), which has a conventional structure, is located above the downstream end of the supply conveyor (69). It stretches the joined bread dough in the lateral direction so that it has a greater width. An intermediate conveyor (76) is arranged between the supply conveyor (69) and the downstream conveyor (77) that is part of the third embodiment. The roller (75) reciprocates over the intermediate conveyor (76) and downstream conveyor (77), while the roller (75) is rotated. On the downstream conveyor (77), a strip of dough is formed from the stretched pieces of dough.

Figure 9:
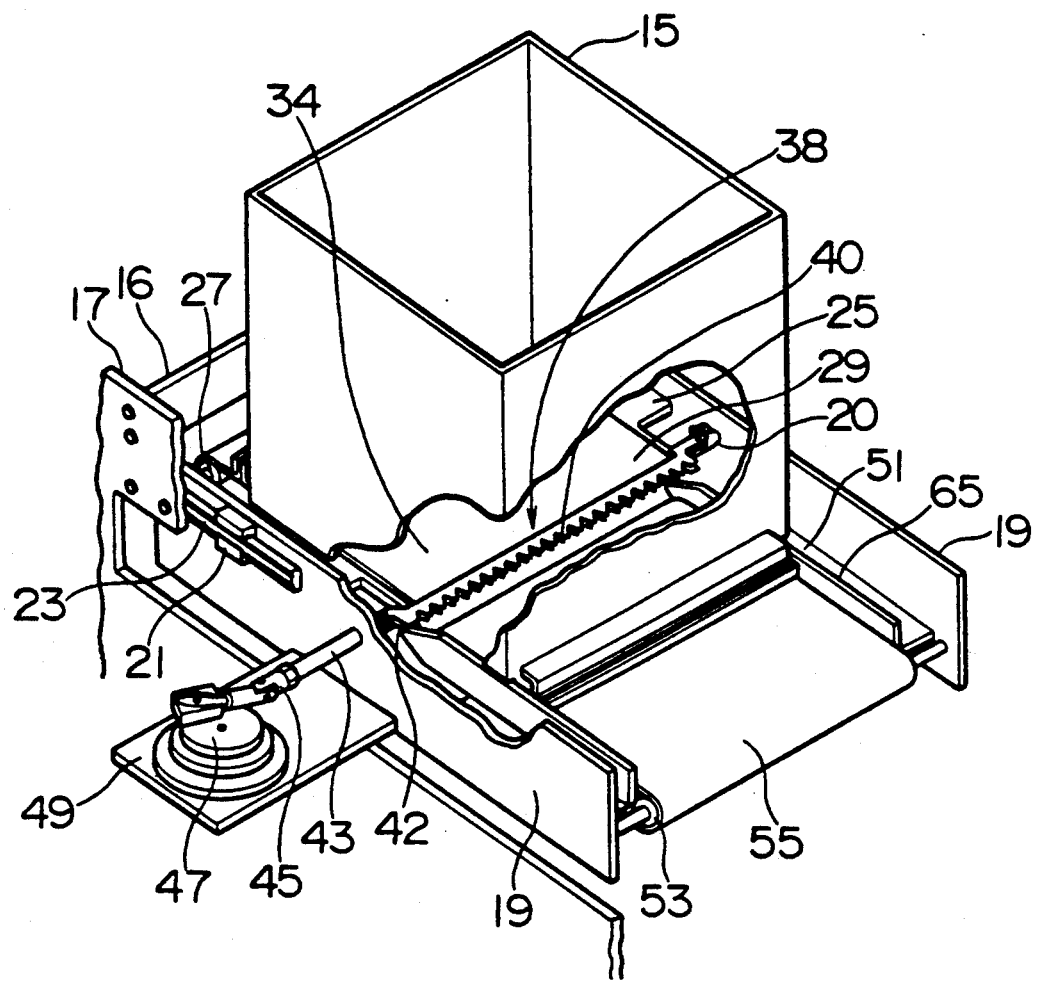
FIG. 9 is a perspective, partially sectional view, illustrating a fifth embodiment of this invention.
Figure 10:
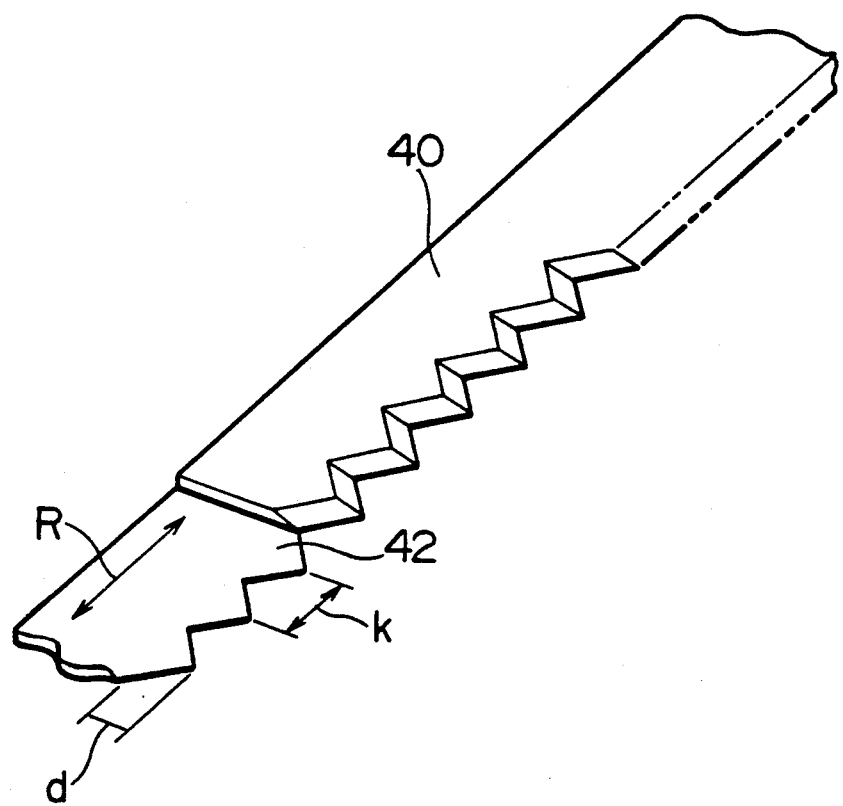
FIG. 10 is a perspective view illustrating the two saw blades used in the fifth embodiment of this invention.

FIG. 9 shows a fifth embodiment of this invention. In it a saw blade means comprising an upper saw blade (40), and a lower saw blade (42) is positioned in front of the forward edge of the first belt (29), and installed on the frame (19). The edge of each of the blades is in line with the edge of the other blade, as shown in FIGS. 9 and 10. The dimensions of each of the blades are the same as that of the blade used in the first embodiment. The upper surface of the upper saw blade (40) is flush with the flat upper surface (34) of the first dough-supporting member (30). The two ends of the upper saw blade (40) are securely mounted on the frame (19), and one of two ends of the lower saw blade (42) is connected to a slide rod (43). The other end of the lower saw blade (42) is adapted to be slidably received in the hole (20). The upper saw blade (40) and lower saw blade (42) are in a positional relationship wherein the edges of these blades are in line with each other. The slide rod (43) extends through the frame (19), and is connected by means of the universal joint (45) to a crank device (47). The crank device (47) is installed on the small plate (49) fixed to the frame (19). Therefore, when the crank device (47) is rotated by a motor (not shown), the lower saw blade (42) is reciprocated at a stroke (R) of 20 mm in the longitudinal direction, while the blades (40,42) are advanced at a speed of 4 mm/min. This lower saw blade (42) may be mounted on the frame (19), and the upper saw blade (40) may be mounted on the slide rod (43). In this case, the upper saw blade (40) is reciprocated. Also, the lower and upper saw blades (40,42) may be arranged so that both of the two saw blades are reciprocated while they slide in relation to each other.

Since the saw blade means comprises two saw blades (40,42), the dough mass can be more finely cut than with the single saw blade of the first embodiment. Therefore, a dough mass is more smoothly severed than by a single saw blade, and a finely cut dough piece surface can be obtained.

Figure 11:
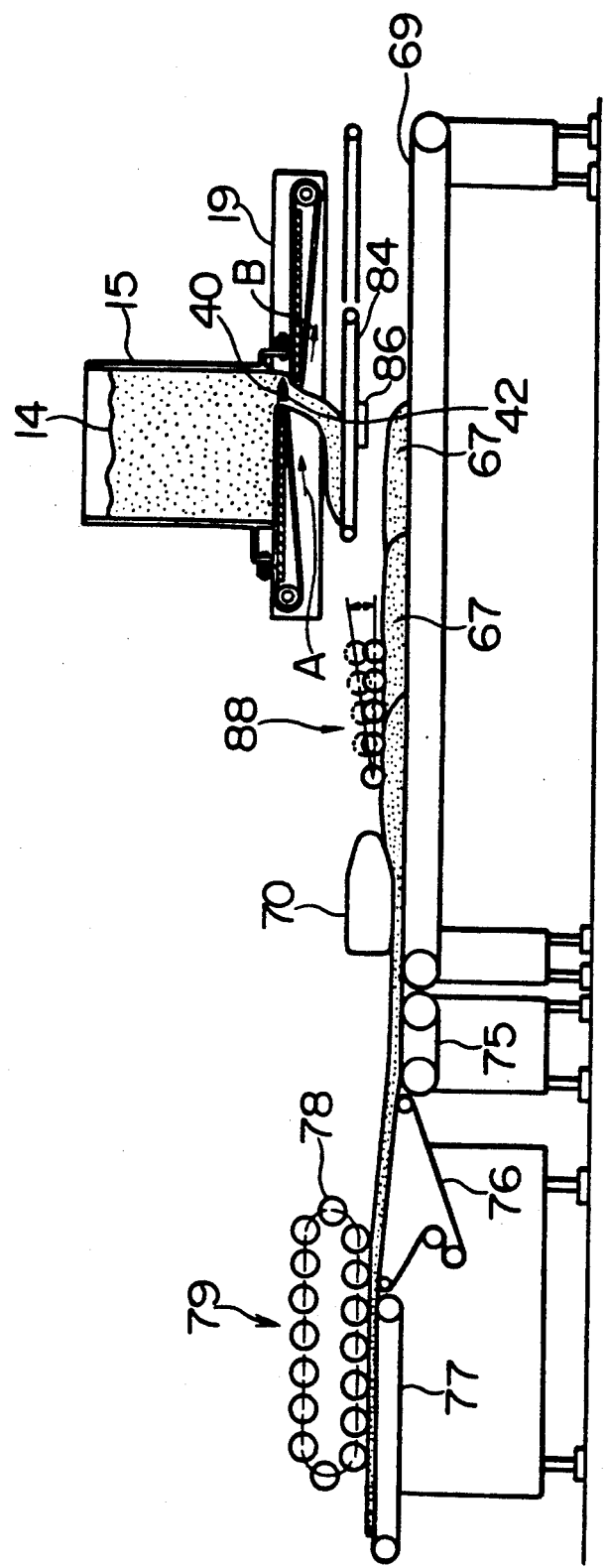
FIG. 11 is a sectional and side elevation view illustrating a sixth embodiment of this invention.
Figure 12:
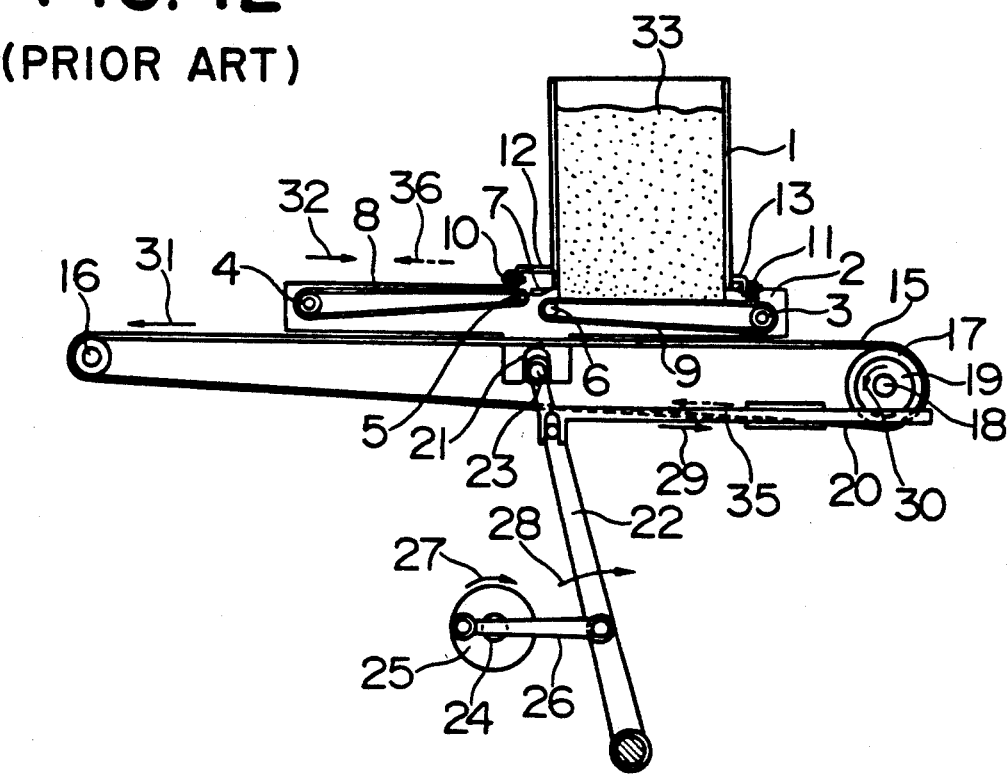
Figure 13:
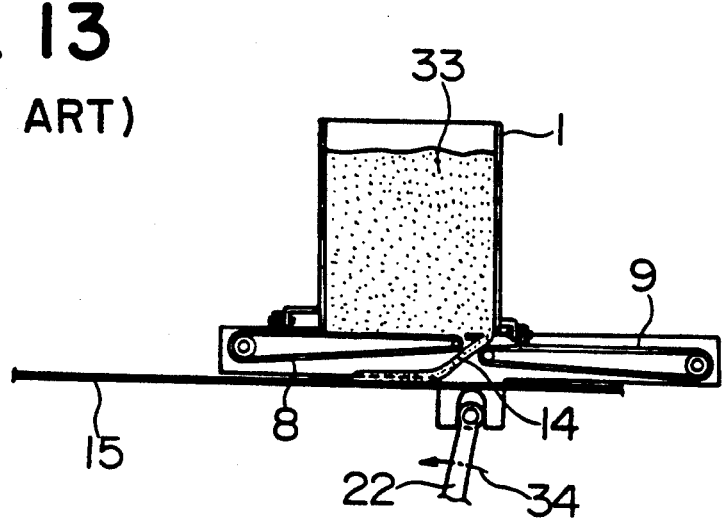

FIG. 11 shows a sixth embodiment of this invention. It is still another apparatus for supplying a uniform strip of bread dough. In this embodiment, the saw blade means comprising the upper saw blade (40) and lower saw blade (42) used in the fifth embodiment is used in the dividing apparatus. A weighing conveyor (84) is arranged below the dividing apparatus. It is adapted to be moved horizontally. A weighing device (86) to weigh pieces of dough (67) is mounted on the weighing conveyor (84). The conveyor (84) is actuated to transfer pieces of dough to, and arrange them on, the supply conveyor (69) located below the weighing conveyor (84). The pieces of dough (67) are placed on the weighing conveyor (84) and weighed by the weighing device (86). A control unit (not shown) that receives the measurements from the weighing device (86) sends a signal to actuate the weighing conveyor (84) to it. Therefore, the pieces of dough (67) are placed on the supply conveyor (69). The control unit sends a signal to actuate the dividing apparatus, when a piece of dough is not placed on the weighing conveyor (84), to the dividing apparatus. Then the next piece of dough is sliced.

From a preset amount to be produced (an amount of dough per hour) and the weight of a divided piece of dough, weighed by the weighing device (86), the length of the divided piece of dough to be obtained is calculated. The distance that the belt of the supply conveyor (69) moves to move the divided piece of dough is the same as that length. Whether the piece of dough (67) is conveyed through that distance can be confirmed by means of a detector, namely, an encoder (not shown) built within the upstream end roller of the supply conveyor (69). The next divided piece of dough is supplied from the weighing conveyor (84) and transferred to the supply conveyor (69).

The pieces of dough (67) are first stretched and firmly joined to each other by a pressing device (88) arranged above the supply conveyor (69), and positioned in front of the crossing roller (70). The pressing device (88) comprises a plurality of rollers held by a pair of arms (not shown). By lifting or lowering the upstream roller, this device can be adjusted to conform to the thickness of the divided pieces of dough, and to stretch them. The stretched dough is compressed by the crossing roller (70). Thus, a strip of dough is continuously produced. This strip of dough may be conveyed downstream by a conveyor (75), and further stretched by a stretcher (79) comprising two conveyors (76,77) and a roller mechanism (79) comprising a plurality of rollers (78). Thus, a uniform strip of dough having a preset thickness is continuously produced.

As stated above, by using the apparatus for dividing bread dough of this invention, when the dough-cutting member, namely, the saw blade means, is advanced into the bread dough mass, no excessive or unreasonable force is imparted to the bread dough. Therefore, the gluten tissue in the dough is prevented from being damaged. This leads to divided dough pieces each having an exactly preset plate-like form. Also, neither a shearing, tensile, nor compressive stress, occurs in the bread dough when it is severed by the saw blade means of this invention. Therefore, bread and confectionery products made by this apparatus can be standardized. This leads to an increased value of the products and high productivity.

Moreover, by using the apparatus of this invention for supplying a uniform strip of dough, divided pieces of bread dough, each having an exactly plate-like form, are supplied, and these divided pieces of bread dough are joined to each other to make a uniform strip of bread dough. Therefore, the bread and confectionery products made from this strip of bread dough can be standardized.

We claim:

1. An apparatus for dividing plastic dough material comprising:

a hopper for dough material, the bottom of which is constituted by a first dough-supporting member, a second dough-supporting member, a dough-cutting member, and a dough material outlet, said first dough-supporting member being movable back and forth, and comprising a flat upper surface, a bottom surface, a horizontal forward edge, and a rearward edge, said forward edge extending perpendicular to the direction of movement of said member, said dough-cutting member comprising a saw blade means, and being, at said forward edge of said first dough-supporting m ember, flush therewith, a drive means for reciprocating said saw blade means in the longitudinal direction while said first dough-supporting member is moved in its advancing direction, said second dough-supporting member being movable in the same direction and in synchronization with said first dough-supporting member, being provided with a flat upper surface positioned at a level lower than the upper surface of said first dough-supporting member, thereby forming said dough material outlet between said second dough-supporting member and said cutting member, and a drive means for moving said first and second dough-supporting members back and forth.

2. The apparatus of claim 1, in which said saw blade means comprises two saw blades wherein the edge of each of said blades is aligned with the edge of the other blade, and at least one of said two saw blades is adapted to reciprocate in the longitudinal direction in a sliding relationship to the other.

3. The apparatus of claim 1, in which each of said first and second dough-supporting members comprises a belt slidably wound around the forward and rearward edges and the upper and bottom surfaces of the member.

4. The apparatus of claim 1, in which each of said first and second dough-supporting members comprises a belt slidably wound around the forward and rearward edges and the upper and bottom surfaces of the member and having two ends securely mounted on the lower part of said hopper for dough material.

5. The apparatus of claim 1, 2, 3, or 4, in which a small-diameter roller is arranged adjacent and below said dough-cutting member.

6. An apparatus for supplying a uniform strip of plastic dough material comprising:

an apparatus for dividing dough material comprising a hopper for dough material, the bottom of which is constituted by a first dough-supporting member, a second dough-supporting member, a dough-cutting member, and a dough material outlet, said first dough-supporting member being movable back and forth, and comprising a flat upper surface, a bottom surface, a horizontal forward edge, and a rearward edge, said forward edge extending perpendicular to the direction of movement of said member, said dough-cutting member comprising a saw blade means, and being, at said forward edge of said first dough-supporting member, flush therewith, a drive means for reciprocating said saw blade means in the longitudinal direction while said first dough-supporting member is moved in its advancing direction, said second dough-supporting member being movable in the same direction and in synchronization with said first dough-supporting member, being provided with a flat upper surface positioned at a level lower than the upper surface of said first dough-supporting member, thereby forming said dough material outlet between said second dough-supporting member and said cutting member, and a drive means for moving said first and second dough-supporting members back and forth, a supply conveyor arranged below said dividing apparatus for conveying divided dough material pieces, a downstream conveyor arranged downstream of said supply conveyor, a single roller or a plurality of rollers spaced apart from the upper flights of said supply and downstream conveyors, and arranged, while being rotated, so as to reciprocate over said supply and downstream conveyors and over a certain distance of the conveyance paths of said two conveyors, and a dough-width-measuring device arranged adjacent the downstream end of said supply conveyor.

7. The apparatus of claim 6, in which said saw blade means comprises two saw blades wherein the edge of each of said blades is aligned with the edge of the other blade, and at least one of said two saw blades is adapted to reciprocate in the longitudinal direction in a sliding relationship to the other.

8. The apparatus of claim 6, in which each of said first and second dough-supporting members comprises a belt slidably wound around the forward and rearward edges and the upper and bottom surfaces of the member.

9. The apparatus of claim 6, in which each of said first and second dough-supporting members comprises a belt slidably wound around the forward and rearward edges and the upper and bottom surfaces of the member and having two ends securely mounted on the lower part of said hopper for dough material.

10. The apparatus of claim 6, 7, 8, or 9 in which a small-diameter roller is arranged adjacent and below said dough-cutting member.

11. The apparatus of claim 6, in which a sensor for detecting the back end of a divided dough material piece is arranged below said dividing apparatus and upstream of said supply conveyor.

12. The apparatus of claim 6, in which the plastic dough material is either bread dough or confectionery dough.

13. An apparatus for supplying a uniform strip of plastic dough material comprising:

an apparatus for dividing dough material comprising a hopper for dough material, the bottom of which is constituted by a first dough-supporting member, a second dough-supporting member, a dough-cutting member, and a dough material outlet, said first dough-supporting member being movable back and forth, and comprising a flat upper surface, a bottom surface, a horizontal forward edge, and a rearward edge, said forward edge extending perpendicular to the direction of movement of said member, said dough-cutting member comprising a saw blade means, and being, at said forward edge of said first dough-supporting member, flush therewith, a drive means for reciprocating said saw blade means in the longitudinal direction while said first dough-supporting member is moved in its advancing direction, said second dough-supporting member being movable in the same direction and in synchronization with said first dough-supporting member, being provided with a flat upper surface positioned at a level lower than the upper surface of said first dough-supporting member, thereby forming said dough material outlet between said second dough-supporting member and said cutting member, and a drive means for moving said first and second dough-supporting members back and forth, a weighing device for weighing divided pieces of dough material located below said dividing apparatus, a supply conveyor arranged below said weighing device for conveying the divided pieces of dough material, a detector for detecting the distance that said supply conveyor travels, a control unit for generating a signal to actuate said weighing device and said dividing apparatus, and a pressure device for pressing said divided pieces of dough material arranged on said supply conveyor.

14. The apparatus of claim 13, in which each of said first and second dough-supporting members comprises a belt slidably wound around the forward and rearward edges and the upper and bottom surfaces of the member.

15. The apparatus of claim 13, in which each of said first and second dough-supporting members comprises a belt slidably wound around the forward and rearward edges and the upper and bottom surfaces of the member and having two ends securely mounted on the lower part of said hopper for dough material.

16. The apparatus of claim 13, in which said saw blade means comprises two saw blades wherein the edge of each of said blades is aligned with the edge of the other blade, and at least one of said two saw blades is adapted to reciprocate in the longitudinal direction in a sliding relationship to the other.

17. The apparatus of claim 13, in which the plastic dough material is either bread dough or confectionery dough.

18. The apparatus of claim 13, 14, 15, or 16, in which a small-diameter roller is arranged adjacent and below said dough-cutting member.

19. The apparatus of claim 1, in which the plastic dough material is either bread dough or confectionery dough.

* * * * *